Aug. 16, 1966  F. L. LE BUS, SR.  3,266,748
EXPANDING HOIST DRUM
Filed Nov. 6, 1963  2 Sheets-Sheet 1

INVENTOR.
F. L. Le Bus Sr.
BY
Mildred K. Flowers
AGENT

Aug. 16, 1966     F. L. LE BUS, SR.     3,266,748
EXPANDING HOIST DRUM

Filed Nov. 6, 1963     2 Sheets-Sheet 2

INVENTOR.
F. L. Le Bus Sr.
BY
Mildred K. Flowers
AGENT

United States Patent Office 3,266,748
Patented August 16, 1966

3,266,748
EXPANDING HOIST DRUM
Franklin L. Le Bus, Sr., Geneva, Switzerland, assignor to Le Bus Royalty Company, Longview, Tex., a partnership
Filed Nov. 6, 1963, Ser. No. 321,886
16 Claims. (Cl. 242—117)

This invention relates to improvements in cable spooling apparatus and more particularly, but not by way of limitation, to an expanding spooling drum.

It is frequently desirable or necessary to wind cable of great lengths onto a spooling or hoisting drum. There are many installations or applications wherein it is desired to spool cable of lengths of five to seven miles, or even greater lengths. For example, many miles of cable may be wound on a spooling drum in preparation for unspooling of the cable into the ocean for laying of underwater lines. In other operations it may be desired to spool great lengths of cable onto a drum for installation in an aircraft whereby the cable may be let out from the aircraft flying at great heights. As a result of the extreme length of the cable used in many operations of this type, it is necessary to spool the cable in multiple layers on the drum core.

In many instances these extreme lengths of cable are initially spooled onto the drum in an environment or under conditions of relatively cold temperatures, and in some instances at temperatures as low as twenty degrees below zero. Subsequent to the spooling of the cable on the drum, the cable usually becomes warmer and as a result will expand in size. The hoisting or spooling drums normally used for these installations confine the spooled cable within fixed limits and as a result, the thermal expansion of the cable in combination with the initial cable tension of the spooled cable on the drum creates tremendous pressures which act against the drum flanges and on the drum core. Radially inward pressure is exerted on the drum core and longitudinal pressure is exerted in the drum flanges. These extreme pressures often warp the flanges and frequently elongates or crushes the drum core. The disadvantages inherent in this problem will be apparent.

The spooling of multiple layers of cable onto the drum core has also presented a problem to the hoisting industry. A counterbalance spooling system for providing a true and efficient winding of multiple layers of cable has been developed by me, and as disclosed in several of my previous patents, such as United States Letters Patent No. 2,620,996, issued December 9, 1952, and entitled "Cable Winding Apparatus"; No. 2,708,080, issued May 10, 1955, and entitled, "Hoisting Drum"; No. 2,732,-150, issued January 24, 1956, and entitled, "Balance Cable Spooling"; and No. 2,734,695, issued February 14, 1956, and entitled, "Balanced Cable Spooling." The spooling system developed by the aforementioned patents has greatly advanced the cable spooling art and has met with wide acceptance in hoisting industry of all types.

The present invention contemplates a novel expandable spooling drum wherein the drum core is particularly designed and constructed for longitudinal variations in order to compensate for the thermal expansion and contraction of the length of cable wound thereon. Thus, the cable is not confined within a fixed area upon expansion or contraction thereof, and the pressures of the cable acting against the drum core and flanges is greatly reduced. The novel spooling drum is so constructed that the pressure of the multiple layers of expanded cable against the drum flanges will increase the distance between the flanges and expand the drum core through a controlled distance or length, thus, substantially precluding warping or stretching of the drum flanges and drum core. The drum core comprises a plurality of longitudinally movable sections disposed between a pair of drum flanges. One of the flanges is stationary and the second of the flanges comprises dual flanges wherein one flange is stationary and one flange is movable. The movable flange is yieldingly engaged by the companion stationary flange in such a manner that the movable flange is constantly urged in a direction toward the first stationary flange. Upon expansion of the cable wound upon the drum core, the movable flange is urged in a direction away from the first stationary flange whereby the effective width of the drum core therebetween is lengthened to accommodate the expanded cable. The plurality of cable drum core sections may move or adjust longitudinally through a complementary distance for efficiently supporting the cable wound thereon. The amount of expansion of the drum core is controlled to preclude undue lengthening of the drum and the inherent disadvantages thereof.

In order to resist the radial pressure from the expanding cable in spooling drums wherein the cable is confined within a constant drum core length, the material from which the core is constructed is usually very thick to strengthen the drum. It will be apparent that the novel drum core of the present invention may be constructed from a much thinner material than possible if the core would have to withstand the pressure of the expanding cable without stretching or elongating. This is a particular advantage in circumstances wherein the weight of the hoisting unit is critical, such as in use in an airplane or the like. In addition, the outer periphery of the novel drum core may be either smooth or grooved in accordance with the Le Bus counterbalanced cable spooling system hereinbefore set forth.

It is an important object of this invention to provide a novel spooling drum particularly designed and constructed to compensate for expansion and contraction of the cable wound thereon.

It is another object of this invention to provide a novel spooling drum wherein the cable wound thereon is not confined within a fixed area, thus greatly reducing the pressure of the cable against the drum upon expansion of the cable wound thereon.

It is another object of this invention to provide a novel spooling drum having an expandable core portion to compensate for contraction and expansion of the cable wound thereon.

Another object of this invention is to provide a novel spooling drum wherein the drum flanges are adapted to be spread apart upon expansion of the cable wound on the drum whereby the wound cable is not confined within a fixed area, thus reducing pressure exerted on the drum upon expansion of the cable.

A further object of this invention is to provide a novel spooling drum having an expandable drum core wherein the expansion of the drum core due to variable pressure from the cable is controlled to preclude excessive longitudinal expansion thereof.

A still further object of this invention is to provide a novel spooling drum particularly designed and constructed for compensation for variations in the size of the cable wound thereon whereby the drum may be constructed from material of a thinner cross-sectional dimension for maintaining the weight of the drum at a minimum.

A still further object of this invention is to provide a novel spooling drum having an expandable core portion and movable flange member which is simple and efficient in operation and economical and durable in construction.

Other and further objects and advantageous features of the present invention will hereinafter more fully appear in connection with the detailed description of the drawings in which.

Figure 1:
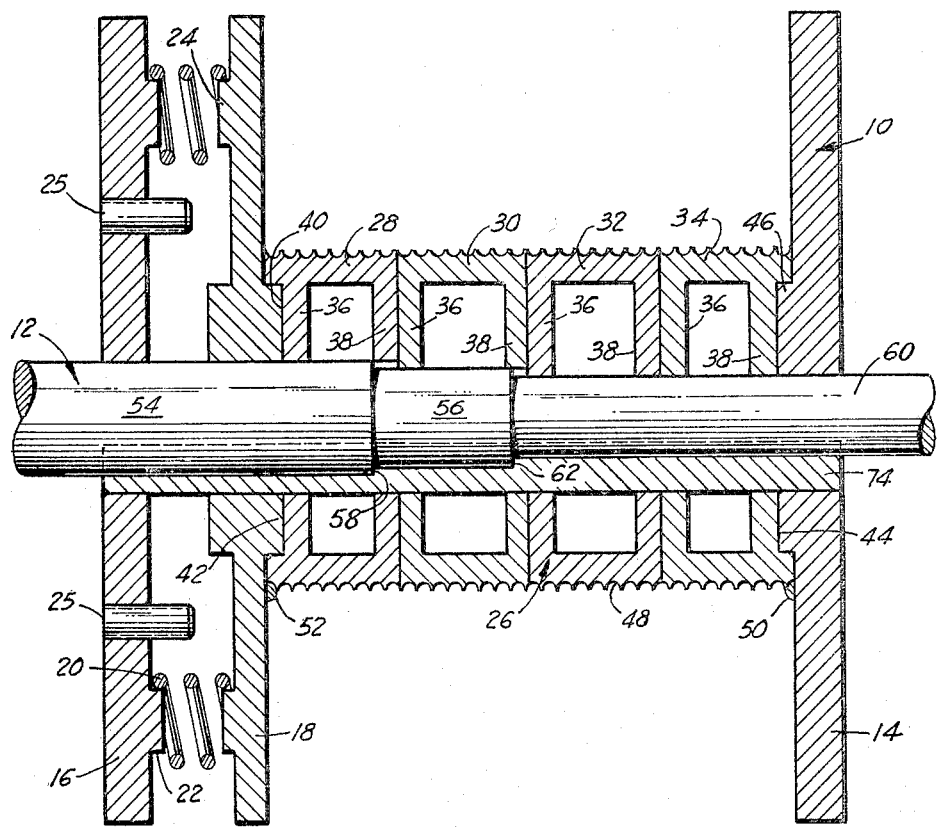
FIGURE 1 is a sectional elevational view of a spooling drum embodying the invention and depicting the core portion in the contracted position.

Referring to the drawings in detail, reference character 10 generally indicates a spooling or hoisting drum having a drive shaft 12 extending axially therethrough. The drum 10 comprises a pair of spaced oppositely disposed flanges 14 and 16, which are rigidly anchored or secured to the shaft 12 in any well known manner (not shown). An intermediate movable flange 18 is interposed between the flanges 14 and 16 and is slidably disposed on the shaft 12 in a manner as will be hereinafter set forth. The movable flange 18 is preferably disposed in the proximity of the stationary flange 16 and is yieldingly supported thereby or secured thereto by means of a plurality of circumferentially spaced springs 20.

A plurality of spaced inwardly directed bosses 22 are provided on the flange 16 in substantial alignment with a plurality of circumferentially spaced similar bosses 24 provided on the flange 18. The springs 20 extend between each pair of the complementary bosses 22 and 24 and are anchored therearound whereby the springs 20 are retained in position between the flanges 16 and 18 for constantly urging the flange 18 in a direction away from the flange 16 and toward the flange 14. A plurality of circumferentially spaced stop screws 25 are adjustably secured to the flange 16 and extend therefrom in a direction toward the movable flange 18 to limit the movement of the flange 18 in a direction toward the flange 16.

Figure 2:
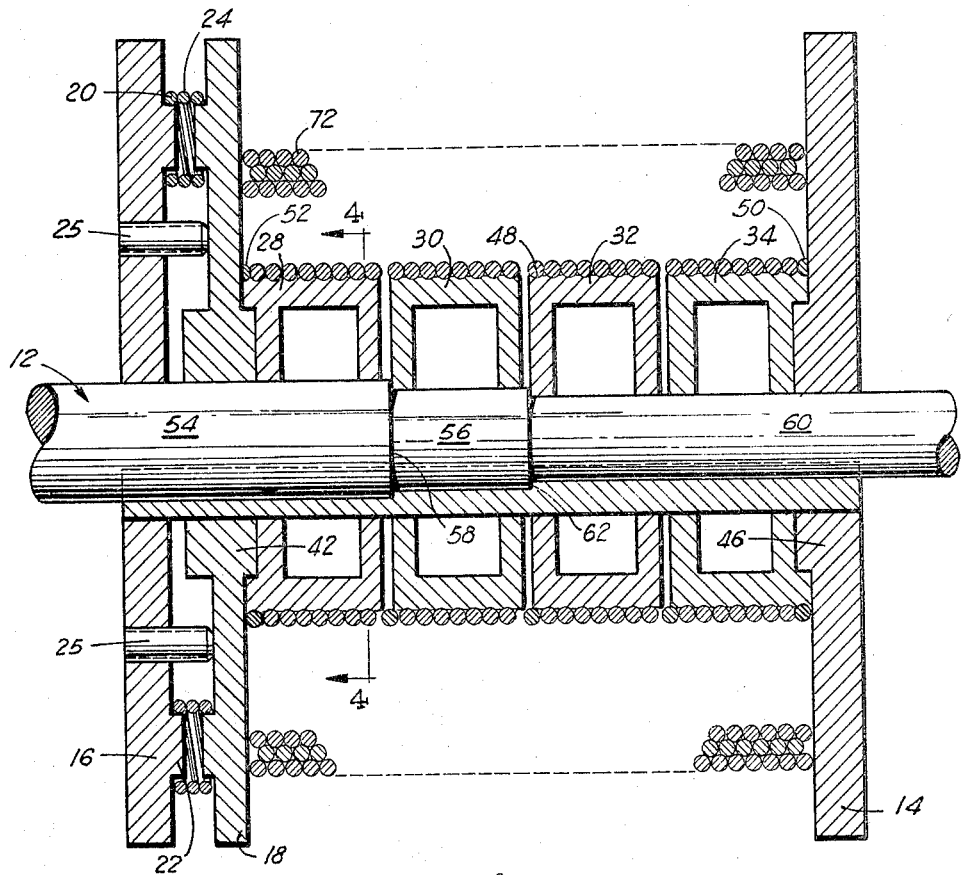
FIGURE 2 is a view similar to FIGURE 1, but showing the drum core in an expanded position and having multiple layers of cable thereon.
Figure 4:
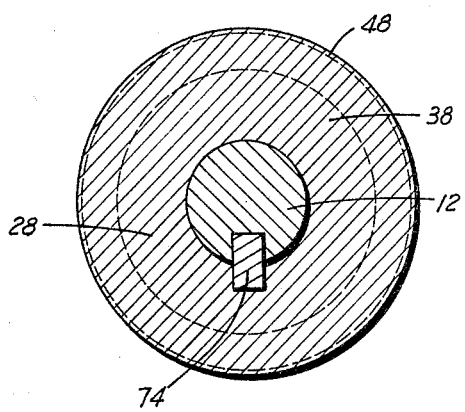
FIGURE 4 is a sectional view taken on line 4—4 of FIGURE 2.

A drum core, generally indicated at 26, is interposed between the stationary flange 14 and movable flange 18 and comprises a plurality of sections or segments 28, 30, 32 and 34 slidably secured to the drive shaft 12 in a manner as will be hereinafter set forth. Whereas four core segments are depicted herein, it is to be understood that substantially any number of these sections may be provided in accordance with the drum size and installation requirements. Each of the drum core sections 28, 30, 32 and 34 is of substantially cylindrical configuration and having the ends thereof closed by annular partitions 36 and 38. The left hand drum core section 28, as viewed in FIGURES 1 and 2, is disposed in the proximity of the movable flange 18. The annular partition 36 of the core section 28 is provided with a recess 40 on the outer surface thereof for receiving a complementary axially extending boss portion 42 provided on the flange 18. In a similar manner, the right hand drum core segment 34, as viewed in the drawings, is provided with a recess 44 on the outer face of the respective partition 38 for receiving a complementary inwardly directed boss 46 provided on the stationary flange 14. It is preferable that the drum core segments 28 and 34 be secured to the inner faces of the drum flanges 18 and 14, respectively, in any well known manner, such as by bolting, or the like (not shown). Of course, the core segments 28 and 34 may be integral with the respective drum flanges 18 and 14, if desired.

The outer periphery of all the core sections 28, 30, 32 and 34 may be smooth, if desired (not shown), or may be provided with the aforementioned Le Bus counterbalanced cable spooling grooving system, as indicated at 48 in FIGURES 1 and 2. Of course, any other type of cable grooving may be provided on the outer periphery of the drum core segments, if desired, but the Le Bus grooving system has been found to provide efficient results in the operation of the novel expandable spooling drum 10.

In instances wherein the outer periphery of the core sections are provided with the grooving 48, the segments may be secured in tandem relation in any well known manner (not shown) and machined in the same manner as a single drum core to provide the desired cable grooving. When the Le Bus grooving system is utilized, arcuate end filler bars 50 and 52 similar to those shown in my prior Patent No. 2,732,150, issued January 24, 1956, and entitled, "Balanced Cable Spooling," are secured in a portion of the outer grooves of the segments 28 and 34. These end filler bars 50 and 52 are thus disposed adjacent the inner faces of the flanges 14 and 18 and facilitates the reversal of the cable at each end of the drum core 26 during the winding operation, as clearly set out in my counterbalanced spooling methods heretofore set forth.

Each of the core portions 28, 30 and 32 is slidably disposed on the drive shaft 12, as hereinbefore set forth, but is also keyed to the drive shaft for simultaneous rotation therewith. The drive shaft 12 is of a step-wise configuration wherein a portion of different diametrical size is provided for each drum core section. The largest diametrical portion 54 of the shaft 12 extends through the fixed position flange 16 and the movable flange 18 and core segment 28 are slidably arranged on this enlarged portion 54 for a purpose as will be hereinafter set forth. The shaft 12 is of a slightly reduced diameter at 56 to provide the next largest diametrical portion. An annular shoulder 58 is provided between the portions 54 and 56 for engagement with the adjacent outer surface of the partition 36 of the segment 30 to limit the longitudinal movement of the segment 30 in one direction. The next succeeding diametrically smaller portion 60 of the drive shaft 12 provides an annular shoulder 62 between the portions 56 and 60 for engagement with the outer surface of the partition 36 of the core section 32 in order to limit the longitudinal movement of the section 32 in one direction. The diametrical portion 60 extends through the core segment 34 and the fixed position flange 14, as clearly shown in the drawings. It will be apparent that the number of varied diameter portions may be selected for the shaft 12 in accordance with the number of drum core segments utilized.

It is to be noted that the shoulders 58 and 62 are so spaced on the shaft 12 and in relation with the respective core segments 30 and 32 as to control the longitudinal movement of the said core sections whereby in the fully extended position of the drum core 26, there can be no spacing between any two adjacent drum core sections of any exceeding great dimension. For example, it is preferable that the spacing between any adjacent core segments never be greater in size than one-half the diameter of the cable 72 wound on the drum and may be maintained with less maximum spacing therebetween, if desired.

A longitudinally extending key member 74 extends throughout the length of the shaft 12 from the stationary flange 14 to the second stationary flange 16 and is rigidly secured to the shaft 12 in any well known manner (not shown). The movable flange 18 and each of the drum core sections 28, 30, 32 and 34 are keyed to the shaft 12 through the key 74 whereby rotation of the shaft 12 is transmitted simultaneously to all portions of the drum. The key member 74 not only transmits simultaneous rotation to the flange 18 and core segments, but also maintains the segments in proper longitudinal and radial alignment at all times. Of course, the end flanges 14 and 16 are fixed position flanges and cannot move longitudinally on the shaft 12 and the key 74 may be utilized, if desired, for transmitting rotation to the flanges 14 and 16, however, the flanges 14 and 16 may be rigidly secured to the shaft 12 in any desired and well known manner.

Figure 3:
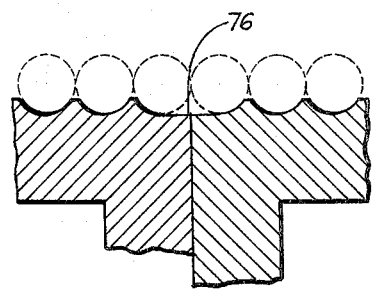
FIGURE 3 is an enlarged sectional view of a typical joint between adjacent drum core sections.

Referring now to FIGURE 3, the groove land of the groove 48 is machined off at all joints between the core sections or segments to provide a relatively smooth outer periphery at each joint, as shown at 76. This prevents binding of the cable at the joints and does not in any manner interfere with the cable winding operation when the drum core 26 is in the contracted position, as shown in FIGURE 1. As hereinbefore set forth, the adjacent drum core segments are never separated by a substantially large distance, preferably not greater than one-half the diameter of the cable, thus, precluding pinching of the cable between the drum sections.

*Operation*

When the spooling or hoisting drum 10 is empty or does not have the cable 72 wound thereon, the drum core segments 28, 30, 32 and 34 are held in abutting relationship between the fixed flange 14 and movable flange 18, as shown in FIGURE 1. The springs 20 constantly urge the flange 18 in a direction toward the flange 14, thus holding the segments in this contracted or closed position. The drum 10 may be driven by the shaft 12 in the usual manner through suitable power means (not shown), as is well known.

As the cable 72 is spooled or wound onto the drum and particularly when the cable size or diameter expands for any reason, the pressure of the cable against the flanges 14 and 18 increases. This increased pressure from the multiple layers of cable moves the flange 18 against the pressure of the springs 20, thus increasing the distance between the flanges 14 and 18. As the flange 18 is thus moved in the direction away from the flange 14, the drum core segments 28, 30 and 32 adjust themselves or move longitudinally along their respective shaft portions toward the position shown in FIGURE 2. In the fully expanded or extended position of the drum 10, each drum segment will be disposed adjacent the respective shoulder of the step-wise shaft 12. This controlled expansion or movement of the drum core segments assures that there will never be any spacing between adjacent pairs of segments sufficiently large to permit the cable 72 to be caught or pinched therebetween. Of course, the outermost core segments 28 and 34 are secured to the respective drum flanges 18 and 14 and the segment 28 moves simultaneously with the flange 18 while the segment 34 remains stationary with the flange 14. This assures that the wraps of the cable on the drum disposed adjacent the drum flanges will not be dislodged or otherwise readjusted during any expansion or contraction of the drum core. In this manner, an efficient control of the cable wound on the drum can be maintained.

The stop screw members 25 are adjustably secured within the fixed flange 16 in any suitable manner, such as by threading, or the like, and limit the movement of the flange 18 in the direction away from the flange 14. It will be apparent that these stop members 25 may be adjusted as desired to permit a predetermined length of travel for the movable flange 18. This movement of the flange 18 in turn controls the overall lengthening of the distance between the flanges 14 and 18 for the expanded position of the drum core 26.

When the pressure of the cable against the flanges 14 and 18 reduces for any reason and becomes less than the pressure of the springs 20, the springs 20 will move the flange 18 in the direction toward the flange 14, thus maintaining the cable 72 efficiently confined therebetween for maintaining the cable efficiently wound on the core segments. It will be apparent that the individual layers of cable, and particularly the outer winds thereof, might slip or move sideways if the flanges 14 and 18 did not bear thereagainst.

As hereinbefore set forth, the flanges 14 and 16 are fixed on the shaft 12 and the flange 18 and drum segments 28, 30, 32 and 34 are keyed to the shaft for simultaneous rotation therewith. Thus, the spooling drum 10 may be operated in the usual manner for spooling or unspooling of the cable 72 in either the contracted or expanded position of the drum. The wound cable is encased within an area which may fluctuate in accordance with the size variations of the cable. It is to be noted, however, that the flanges 14 and 18 bear against the outer winds of the multiple layers of cable at all times for assuring the maintenance of efficiently wound cable on the drum.

From the foregoing, it will be apparent that the present invention contemplates a novel expandable spooling drum, particularly designed and constructed to compensate for any size variations in the cable wound thereon. The expandable drum core and movable flange respond to increased pressure from the cable for increasing the area confining the wound cable and conversely, respond to decreased pressure from the cable for decreasing the area confining the cable. The novel expandable spooling drum is simple and efficient in operation and economical and durable in construction.

Whereas, the present invention has been described in particular relation to the drawings attached thereto, it should be understood that other and further modifications, apart from those shown or suggested herein, may be made within the spirit and scope of this invention.

What is claimed is:

1. A spooling drum for receiving a cable and comprising a drive shaft, a pair of spaced fixed flange members secured to the shaft, a movable flange carried by the shaft and slidable therealong, an expandable core carried by the shaft for receiving the cable thereon, said core cooperating with the fixed flange members and movable flange for adjusting the effective length of the core to compensate for any size variations in the cable wound on the drum for reducing the pressure of the cable on the flanges and core.

2. A spooling drum for receiving a cable and comprising a drive shaft, a pair of spaced fixed flange members secured to the shaft, movable flange means carried by the shaft and in association with one of the fixed flange members, expandable drum core means carried by the shaft for receiving the cable thereon, said movable flange means and expandable core means responsive to pressure fluctuations of the cable for varying the effective length of the core means in accordance with cable pressure for reducing any deforming pressures acting on the spooling drum.

3. A spooling drum for receiving multiple layers of cable and comprising a central drive shaft, a pair of spaced stationary flanges secured to the shaft for simultaneous rotation therewith, a movable flange carried by the shaft and rotatable therewith, said movable flange yieldingly supported from one of said stationary flanges, expandable core means interposed between the movable flange and the other of said stationary flanges for receiving the cable thereon and rotatable with said shaft, said movable flange and expandable core means responsive to pressure from the cable for varying the distance between the movable flange and the said other stationary flange to compensate for size variations of the wound cable.

4. A cable spooling drum comprising a central drive shaft, a pair of spaced fixed flanges secured to the shaft for simultaneous rotation therewith, a movable flange carried by the shaft and interposed between the fixed flanges, yielding means securing the movable flange with the first of said fixed flanges and constantly urging the movable flange in a direction toward the second of said fixed flanges, a sectional drum core carried by the shaft and interposed between the movable flange and the said second fixed flange for receiving cable thereon, said sectional core and movable flange responsive to pressure variations of the cable for varying the distance between the movable flange and the second fixed flange to adjust the effective length of the sectional core in accordance with variable cable sizes for reducing any deforming pressure of the cable on the spooling drum.

5. A cable spooling drum comprising a central drive shaft, a pair of spaced flanges rigidly fixed to the shaft and rotatable simultaneously therewith, a movable flange carried by the shaft and interposed between the said fixed flanges, said movable flange slidable along said shaft and rotatable simultaneously therewith, a plurality of drum core segments interposed between the movable flange and the first of said fixed flanges for receiving a cable thereon, yielding means securing said movable flange with the second of said fixed flanges for constantly urging the movable flange in a direction toward the first fixed flange and compressing the drum core segments therebetween, said movable flange responsive to pressure of the cable wound on the drum core for varying the distance between the movable flange and the first fixed flange whereby the drum core segments may expand for increasing the effective length in accordance with size variations of the wound cable.

6. An expandable cable spooling drum comprising a sectional core portion carried by a drive shaft and longitudinally movable therealong, fixed flange means carried by the shaft and disposed at opposite ends of the sectional core portion, a cable wound on the sectional core portion and interposed between the fixed flange means, movable flange means carried by said shaft and yieldingly supported by said fixed flange means for constantly urging the movable flange into contact with the cable wound on the sectional core portion, said movable flange and sectional core portion responsive to pressure variations from the cable wound on the sectional core portion for varying the effective length of the core portion in accordance with variations of the cable size.

7. An expandable spooling drum for receiving multiple layers of cable wound thereon and comprising a central drive shaft, an expandable core portion carried by the shaft for receiving the cable and rotatable with the shaft, a pair of spaced stationary flanges secured to the shaft on opposite ends of the expandable core and rotatable with the shaft, a movable flange carried by the shaft and interposed between the stationary flanges and bearing against one end of the core portion, yielding means securing the movable flange with one of said stationary flanges for constantly urging the movable flange in a direction toward the other of said stationary flanges for maintaining the expandable core in a normally contracted position, said movable flange and expandable core responsive to the pressure of the cable for adjusting the distance between the movable flange and the said other stationary flange for reducing the deforming pressure of the cable on the drum.

8. An expandable spooling drum as set forth in claim 7 wherein the expandable core portion comprises a plurality of segments slidably secured to the drive shaft for longitudinal movement therealong to increase the effective length of the core portion.

9. An expandable spooling drum for receiving multiple layers of cable thereon and comprising a central drive shaft, an expandable core portion carried by the shaft for receiving the cable thereon, a first fixed flange secured to the shaft adjacent one end of the core portion, a movable flange carried by the shaft and disposed adjacent the opposite end of the core portion, a second fixed flange secured to the shaft and spaced slightly from the movable flange, resilient means interposed between the movable flange and the second fixed flange for constantly urging the movable flange in a direction toward the first flange to provide a normally contracted position for the core portion, said movable flange and core portion responsive to pressure variations of the cable for alternately expanding and contracting the core portion in accordance with size variations of the cable, and stop means carried by the second flange for limiting the movement of the movable flange in a direction away from the first fixed flange upon expanding of the core portion.

10. An expandable spooling drum for receiving multiple layers of cable thereon and comprising a central drive shaft, an expandable core portion carried by the shaft for receiving the cable thereon, a first fixed flange secured to the shaft adjacent one end of the core portion, a movable flange carried by the shaft and disposed adjacent the opposite end of the core portion, a second fixed flange secured to the shaft and spaced slightly from the movable flange, resilient means interposed between the movable flange and the second fixed flange for constantly urging the movable flange in a direction toward the first flange to provide a normally contracted position for the core portion, said movable flange and core portion responsive to pressure variances of the cable for alternately expanding and contracting the core portion in accordance with size variations of the cable, means cooperating between the shaft and the expandable core portion for controlling the length of expansion of the core portion, and stop means carried by the second flange for limiting the movement of the movable flange in a direction away from the first fixed flange upon expanding of the core portion.

11. An expandable spooling drum for receiving cable thereon and comprising a central drive shaft, an expandable core portion carried by the shaft for receiving the cable thereon, means cooperating between the shaft and the core portion to provide simultaneous rotation therebetween, a pair of fixed flange members secured to the shaft adjacent the opposite ends of the core portion, a movable flange carried by the shaft and disposed adjacent one of the fixed flanges, means cooperating between the movable flange and the associated fixed flange for constantly urging the movable flange in a direction toward the other of said fixed flanges for compressing the core portion therebetween, said movable flange and expandable core portion responsive to pressure variances of the cable for adjusting the distance between the movable flange and the fixed flange to reduce the deforming pressure of the cable on the drum, and means cooperating between the drive shaft and the core portion for controlling the amount of expansion of the core portion.

12. An expandable cable spooling drum comprising a pair of spaced fixed flanges, a movable flange interposed between the fixed flanges, an expandable core portion interposed between the movable flange and the first of said fixed flanges for receiving a cable thereon, means cooperating between the second of said fixed flanges and the movable flange for urging the movable flange in a direction toward the first fixed flange to maintain a normally contracted position for the expandable core portion, said expandable core and movable flange responsive to pressure of the cable for varying the distance between the movable flange and the first fixed flange whereby deforming pressure of the cable on the drum is reduced, and means for controlling the expansion distance of the expandable core portion.

13. An expandable cable spooling drum comprising a central drive shaft having a plurality of sequentially reduced diameter portions providing a plurality of spaced annular shoulders thereon, an expandable core portion for receiving cable thereon and disposed on said sequentially reduced portions of the shaft, a fixed flange secured to the shaft adjacent one end of the expandable core portion, a movable flange carried by the shaft and disposed adjacent the opposite end of the core portion, yielding means for constantly urging the movable flange in a direction toward the fixed flange for compressing the expandable core portion therebetween, means cooperating between the shaft and the expandable core portion and movable flange to provide simultaneous rotation therebetween, said movable flange and expandable core portion responsive to pressure variances of the cable for expanding the core portion to reduce the deforming pressure of the cable on the spooling drum, said shoulders cooperating with said expandable core portion to limit the expandable length of the expandable core portion.

14. An expandable cable spooling drum comprising a central drive shaft having a plurality of sequentially reduced diametrical portions providing a plurality of spaced annular shoulders, an expandable core portion disposed on the sequentially reduced diameter portions for receiving cable thereon, a first fixed flange secured to the drive shaft adjacent one end of the core portion, a movable flange slidably disposed on the shaft adjacent the opposite end of the core portion, a second fixed flange secured to the shaft and spaced from the movable flange, spring means interposed between the movable flange and the second fixed flange for urging the movable flange in a direction toward the first fixed flange to compress the expandable core portion therebetween, said expandable core portion and movable flange responsive to pressure variances of the cable for adjusting the distance between the movable flange and the first fixed flange and increasing the effective length of the core portion, said shoulders cooperating with said expandable core portion for controlling the expandable distance of the core portion, adjustable stop means carried by the second fixed flange for limiting the movement of the movable flange in a direction away from the first fixed flange, and key means cooperating between the shaft and the core portion and the movable flange to provide simultaneous rotation therebetween.

15. An expandable cable spooling drum as set forth in claim 14 wherein the expandable core portion comprises a plurality of substantially cylindrical segments wherein each segment is disposed on a respective reduced portion of the shaft, and each segment cooperating with the respective shoulder on the shaft for controlling the longitudinal travel of each of the core segments.

16. An expandable cable spooling drum as set forth in claim 14 wherein the outer periphery of the expandable core portion is provided with cable receiving grooves.

References Cited by the Examiner

UNITED STATES PATENTS 869,871 11/1907 Barnes _____ 242—71.9

STANLEY N. GILREATH, *Primary Examiner.*

MERVIN STEIN, *Examiner.*

G. F. MAUTZ, *Assistant Examiner.*